United States Patent [19]
Cullen et al.

[11] Patent Number: 5,746,049
[45] Date of Patent: May 5, 1998

[54] METHOD AND APPARATUS FOR ESTIMATING AND CONTROLLING NO X TRAP TEMPERATURE

[75] Inventors: Michael John Cullen, Northville, Mich.; Steven Dinsdale, Little Evesden, United Kingdom; Christopher K. Davey, Novi, Mich.

[73] Assignee: Ford Global Technologies, Inc., Dearborn, Mich.

[21] Appl. No.: 768,003

[22] Filed: Dec. 13, 1996

[51] Int. Cl.⁶ .................................................. F01N 3/20
[52] U.S. Cl. ........................ 60/274; 60/276; 60/289
[58] Field of Search ........................ 60/274, 276, 289

[56] References Cited

U.S. PATENT DOCUMENTS

| | | | |
|---|---|---|---|
| 5,388,403 | 2/1995 | Nagami | 60/289 |
| 5,402,641 | 4/1995 | Katoh et al. | 60/285 |
| 5,414,994 | 5/1995 | Cullen et al. | 60/274 |
| 5,444,977 | 8/1995 | Kawabata | 60/285 |
| 5,584,176 | 12/1996 | Meyer | 60/277 |
| 5,606,855 | 3/1997 | Tomisawa | 60/276 |
| 5,619,852 | 4/1997 | Uchikawa | 60/276 |

*Primary Examiner*—Douglas Hart
*Attorney, Agent, or Firm*—Allan J. Lippa; Roger L. May

[57] ABSTRACT

An engine control computer estimates $NO_x$ trap temperature based on an estimated midbed temperature of a three-way catalytic converter located upstream from the trap and the effect on $NO_x$ trap temperature of introducing air into the exhaust upstream of the trap during purging of the trap.

8 Claims, 5 Drawing Sheets

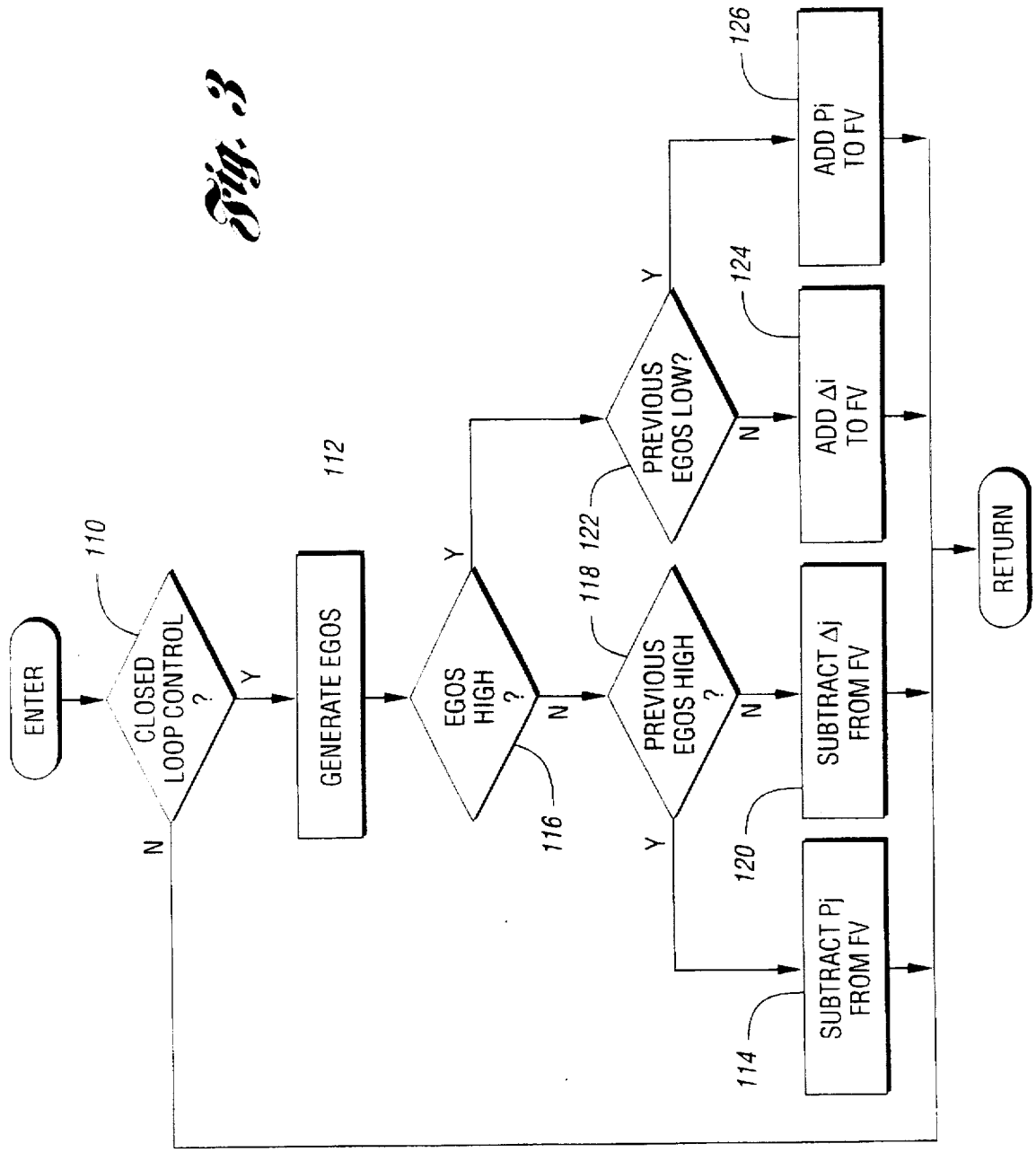

5,746,049

METHOD AND APPARATUS FOR ESTIMATING AND CONTROLLING NO X TRAP TEMPERATURE

TECHNICAL FIELD

This invention relates to vehicle emissions control and, more particularly, to a method and apparatus for inferring $NO_x$ (nitrogen oxides) trap temperature and for preventing the trap temperature from exceeding a predetermined maximum temperature.

BACKGROUND ART

Conventional lean burn engine control systems include an air/fuel controller that delivers fuel to the engine intake manifold proportional to measured air mass to maintain a desired air/fuel ratio, lean of stoichiometric. The typical three-way catalytic converter provided in the engine exhaust passage does not convert the $NO_x$ produced while running lean and in order to reduce $NO_x$ emission to the atmosphere, it has been proposed to locate a $NO_x$ trap downstream of the three-way catalyst. A typical $NO_x$ trap utilizes alkali metal or alkaline earth materials in combination with platinum in order to store or occlude $NO_x$ under lean operating conditions. The mechanisms for $NO_x$ storage involves the oxidation of NO to $NO_2$ over the platinum followed by the subsequent formation of a nitrate complex with the alkaline metal or alkaline earth. Under stoichiometric operation or operation rich of stoichiometric, the nitrate complexes are thermodynamically unstable, and the stored $NO_x$ is released and catalytically reduced by the excess of CO, $H_2$, and hydrocarbons (HCs) in the exhaust. Accordingly, the lean burn engine is periodically switched to a relatively rich air/fuel ratio to purge the $NO_x$ trap. The $NO_x$ trap must be exposed to a minimum threshold temperature before it will perform efficiently and accordingly a minimum exhaust temperature must be established before a lean burn mode of engine operation is established. There is also an upper or maximum temperature above which the trap may be degraded.

Over time, the $NO_x$ trap becomes saturated with sulfur oxides ($SO_x$) and must be purged of the $SO_x$ in order to be able to trap the $NO_x$. One of the methods for purging the $SO_x$ is to introduce air directly into the exhaust passage just upstream of the trap thereby raising the temperature of the trap and burning off the sulfur deposits. It is necessary to raise the temperature of the trap to about 1500° F. in order to accomplish the sulfur purge. However, the trap may be degraded if the temperature exceeds about 1600° F. Thus, proposals have been made to add a trap temperature sensor in order to monitor and control the trap temperature. This approach is expensive and, accordingly, there is a need for a less costly method of determining trap temperature and to limit the trap temperature during vehicle operation.

SUMMARY OF THE INVENTION

In view of the above, it is an object of the present invention to provide a method and apparatus for inferring and controlling the temperature of a $NO_x$ trap located downstream from a three-way catalyst.

In accordance with the present invention, the engine control computer estimates $NO_x$ trap temperature based on the position of the $NO_x$ trap downstream from a three-way catalytic converter, and considering the effect on $NO_x$ trap temperature of introducing air upstream of the trap during purging of the $NO_x$ trap.

BRIEF DESCRIPTION OF THE DRAWINGS

A more complete understanding of the present invention may be had from the following detailed description which should be read in conjunction with the drawings in which:

FIGS. 2, 3 and 4 are high level flowcharts of conventional engine fuel control and $NO_x$ purging schemes;

DETAILED DESCRIPTION OF THE PREFERRED EMBODIMENT

Figure 1:
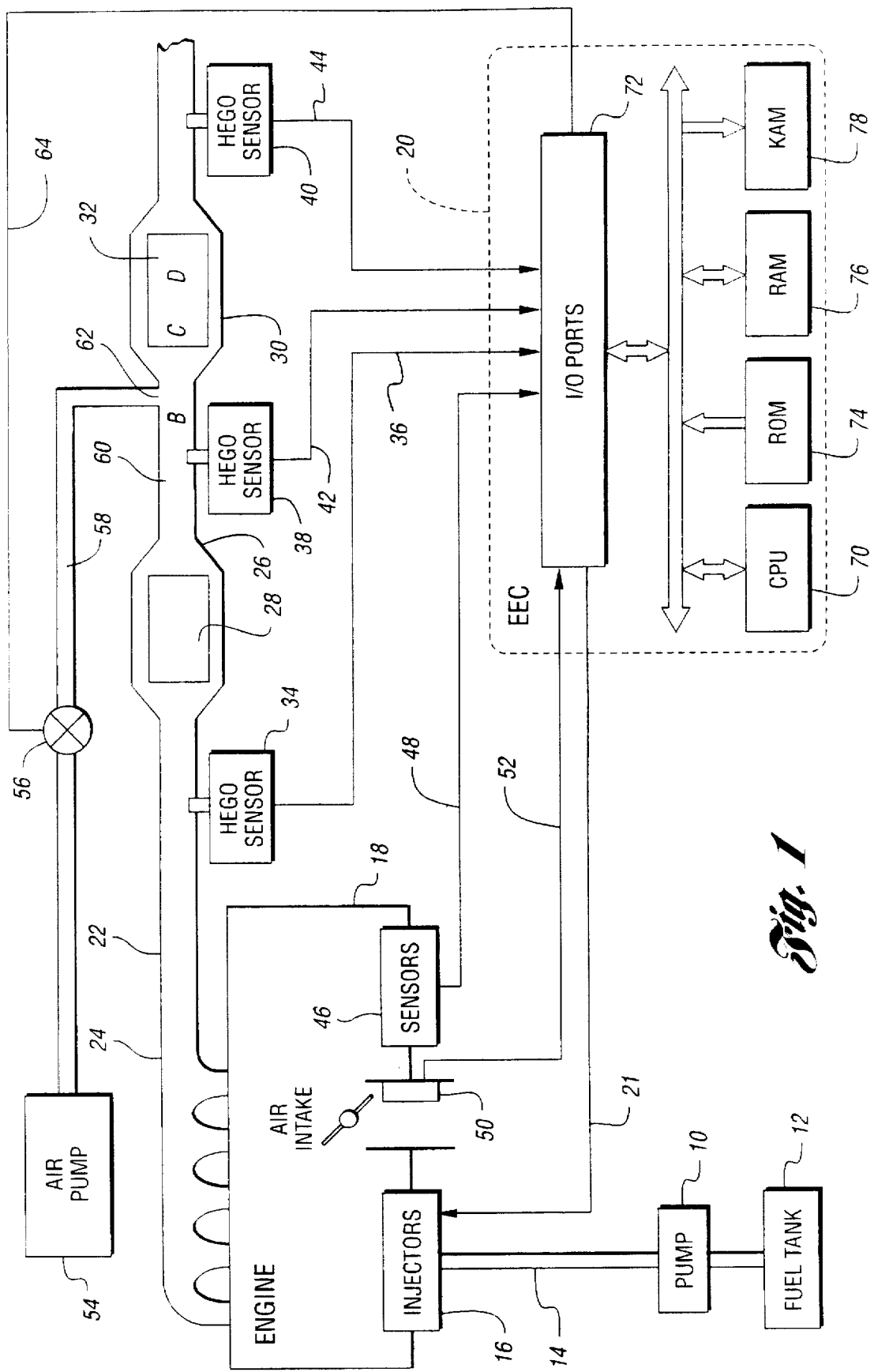
FIG. 1 is a block diagram of a vehicle engine and an electronic engine controller which embodies the principles of the invention.

Referring now to the drawings, and initially to FIG. 1, a fuel pump 10 pumps fuel from a tank 12 through a fuel line 14 to a set of injectors 16 which inject fuel into an internal combustion engine 18. The fuel injectors 16 are of conventional design and are positioned to inject fuel into their associated cylinder in precise quantities as determined by an electronic engine controller (EEC) 20. The EEC 20 transmits a fuel injector signal to the injectors 16 via signal line 21 to maintain an air/fuel ratio determined by the EEC 20. The fuel tank 12 contains liquid fuels, such as gasoline, methanol or a combination of fuel types. An exhaust system 22, comprising one or more exhaust pipes and an exhaust flange 24, transports exhaust gas produced from combustion of an air/fuel mixture in the engine to a conventional three way catalytic converter 26. The converter 26, contains a catalyst material 28 that chemically alters exhaust gas that is produced by the engine to generate a catalyzed exhaust gas.

The catalyzed exhaust gas is fed to a downstream $NO_x$ trap 32 composed of material of the type previously described. The trap 32 is contained in a housing generally indicated at 30. A heated exhaust gas oxygen (HEGO) sensor 34, detects the oxygen content of the exhaust gas generated by the engine 18, and transmits a signal over conductor 36 to the EEC 20. A pair of HEGO sensor 38 and 40 are located upstream and downstream respectively of the trap 32, and provide signals to the EEC 20 over conductors 42 and 44, respectively. Still other sensors, indicated generally at 46, provide additional information about engine performance to the EEC 20, such as crankshaft position, angular velocity, throttle position, air temperature, etc. The information from these sensors is used by the EEC 20 to control engine operation.

A mass air flow sensor 50 positioned at the air intake of engine 18 detects the amount of air inducted into an induction system of the engine and supplies an air flow signal over conductor 52 to the EEC 20. The air flow signal is utilized by EEC 20 to calculate an air mass (AM) value which is indicative of a mass of air flowing into the induction system in lbs./min.

An air pump 54, which may be electrically powered or mechanically coupled to the engine 18 provides a pressurized source of air from the atmosphere, for injecting air through an air passage 58 into an exhaust passage portion 60 at a pierce point 62 downstream of the catalytic converter 26 and generally at the entrance of the $NO_x$ trap 32. The amount of air injected depends on the positioning of a control valve 56 under the control of EEC 20 over conductor 64. The control valve 56 may be ON/OFF valve which opens and closes in accordance with a control signal or may be a flow control valve which can adjust flow rate continuously.

The EEC 20 comprises a microcomputer including a central processor unit (CPU) 70, input and output (I/O) ports 72, read only memory (ROM) 74 for storing control programs, random access memory (RAM) 76, for temporary data storage which may also be used for counters or timers, and keep-alive memory (KAM) 78 for storing learned values. Data is communicated over a conventional data bus as shown. The EEC 20 also includes an engine off timer that provides a record of the elapsed time since the engine was last turned off as a variable "soaktime".

Figure 2:
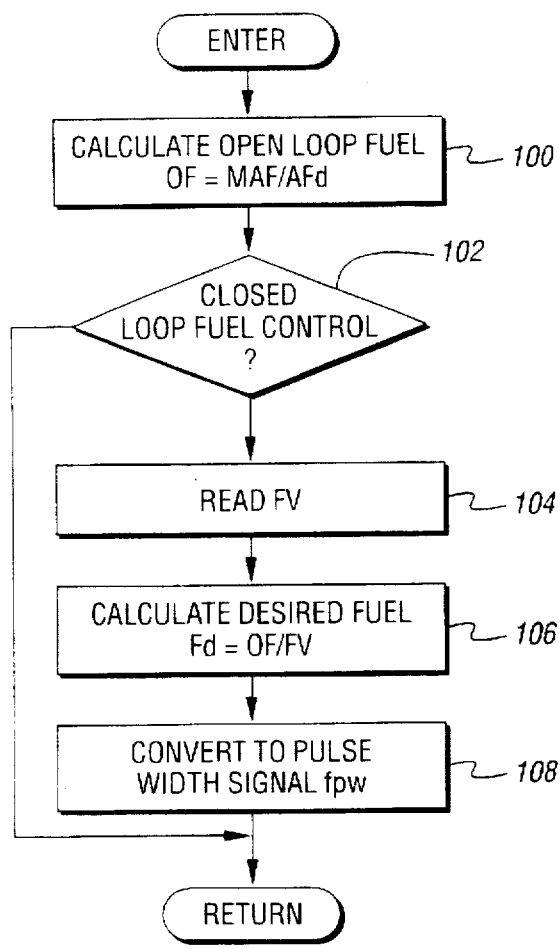

The liquid fuel delivery routine executed by controller 20 for controlling engine 18 is shown in the flowchart of FIG. 2. An open loop calculation of desired liquid fuel is calculated at block 100. More specifically, the measurement of inducted mass air flow (MAF) from sensor 34 is divided by a desired air fuel ratio (AFd) which in this example, is correlated with stoichiometric combustion. At decision block 102, a determination is made whether closed loop feedback control is desired, by monitoring engine operating parameters such as engine coolant temperature. Fuel command or desired fuel signal Fd is generated by dividing feedback variable FV, read at block 104, into the previously generated open loop calculation of desired fuel in block 106. Desired fuel signal Fd is then converted to a pulse width signal fpw at block 108 for actuating fuel injector 16 thereby delivering fuel to engine 18 in relation to the magnitude of the desired fuel signal Fd.

The air/fuel feedback routine executed by controller 20 to generate fuel feedback variable FV is shown in the flowchart in FIG. 3. Under closed loop control as determined at block 110, a two-state signal EGOS is generated at block 112 from the signal provided by the sensor 34. Predetermined proportional tern Pj is subtracted from feedback variable FV at block 114 when the signal EGOS is low, but was high during the previous background loop of controller 20 as determined at decision blocks 116 and 118. When signal ECOS is low and was also low during the previous background loop, predetermined integral term Aj is subtracted from feedback variable FV at block 120.

On the other hand, when signal EGOS is high and was also high during the previous background loop of controller 20, as determined at decision blocks 116 and 122, integral term Ai is added to feedback variable FV at block 124. When signal EGOS is high but was low during the previous background loop, proportional term Pi is added to feedback variable FV at block 126.

Figure 4:
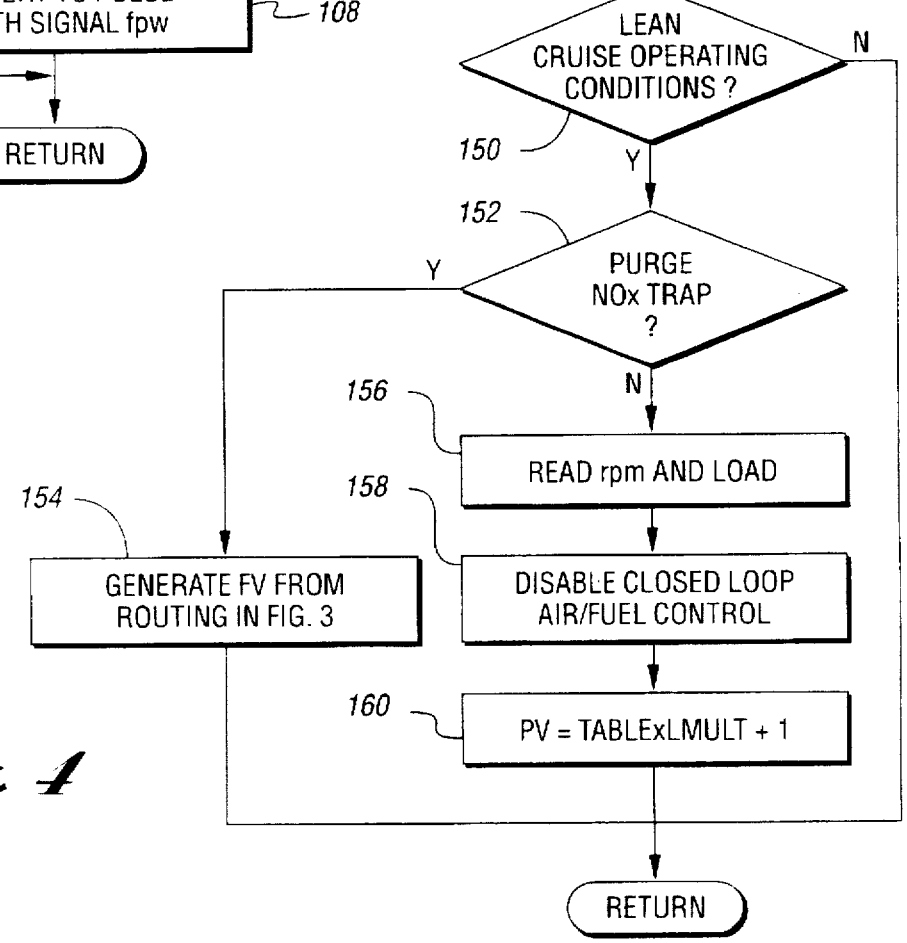

Referring now to FIG. 4, the lean cruise mode of engine operation is depicted. In general, during the lean cruise mode, air/fuel operation proceeds open loop at a predetermined value such as 19 lb air/lb fuel for enhanced fuel economy. $NO_x$ trapping material 32 will store nitrogen oxides passing through catalytic converter 26. Periodically, the material 32 must be purged of stored nitrogen oxides by operating the engine at an air/fuel ratio rich of stoichiometric. Lean cruise operating conditions such as vehicle speed being above a predetermined value or throttle position being above a predetermined value are checked at block 150. Lean cruise operation will commence unless the material 32 is near its capacity and should be purged as determined at block 152. Should that be the case, feedback variable FV is generated at block 154 as provided in a closed loop stoichiometric air/fuel ratio or in an open loop air/fuel ratio rich of stoichiometric. Purging of the $NO_x$ trap may continue for a variable time interval until the trap is relatively free of $NO_x$. Various procedures have been proposed for determining when to terminate purge as well as when to initiate a $SO_x$ purge of the trap. See, for example, copending application FMC 0769 PUS, filed October, 1996, and assigned to the assignee of the present invention.

On the other hand, if purge conditions are not present, the routine continues for lean cruise conditions. Engine rpm and load are read at block 156, closed loop air/fuel control is disabled at block 158, and feedback variable FV is generated in an open loop manner to provide lean air/fuel engine operation. More specifically, at block 160 in this particular example, feedback variable FV is generated by reading a look-up table value as a function of engine speed and load and multiplying the table value by a multiplier LMULT. The resulting product is then added to unity which is the stoichiometric air/fuel reference. Multiplier LMULT, which varies between 0 and unity, is gradually incremented to ramp engine air/fuel operation to a desired lean air/fuel ratio. Feedback variable FV is thereby generated which is an indication of desired air/fuel air ratio.

The operations of running lean followed by a $NO_x$ purge operation continue as long as the efficiency of the trap remains above a desired efficiency. As the efficiency decreases, the lean cruise time may be reduced in order to purge the trap more frequently. It is known, however, that sulfur in the fuel will contaminate the $NO_x$ trap with sulfur oxides ($SO_x$) and if not removed will render the $NO_x$ trap incapable of performing the $NO_x$ trapping function. If the efficiency of the trap requires purging more frequently than a predetermined time interval, it may indicate that a $SO_x$ purge is needed. A $SO_x$ purge requires passing exhaust gases over the trap at a higher temperature than that necessary for $NO_x$ purging. To achieve the higher temperature, additional air is introduced from the air pump 54, under control of the controller 20, at the entrance area of the trap 32 and just downstream of the location generally indicated at "B" in FIG. 1.

Figure 5A:
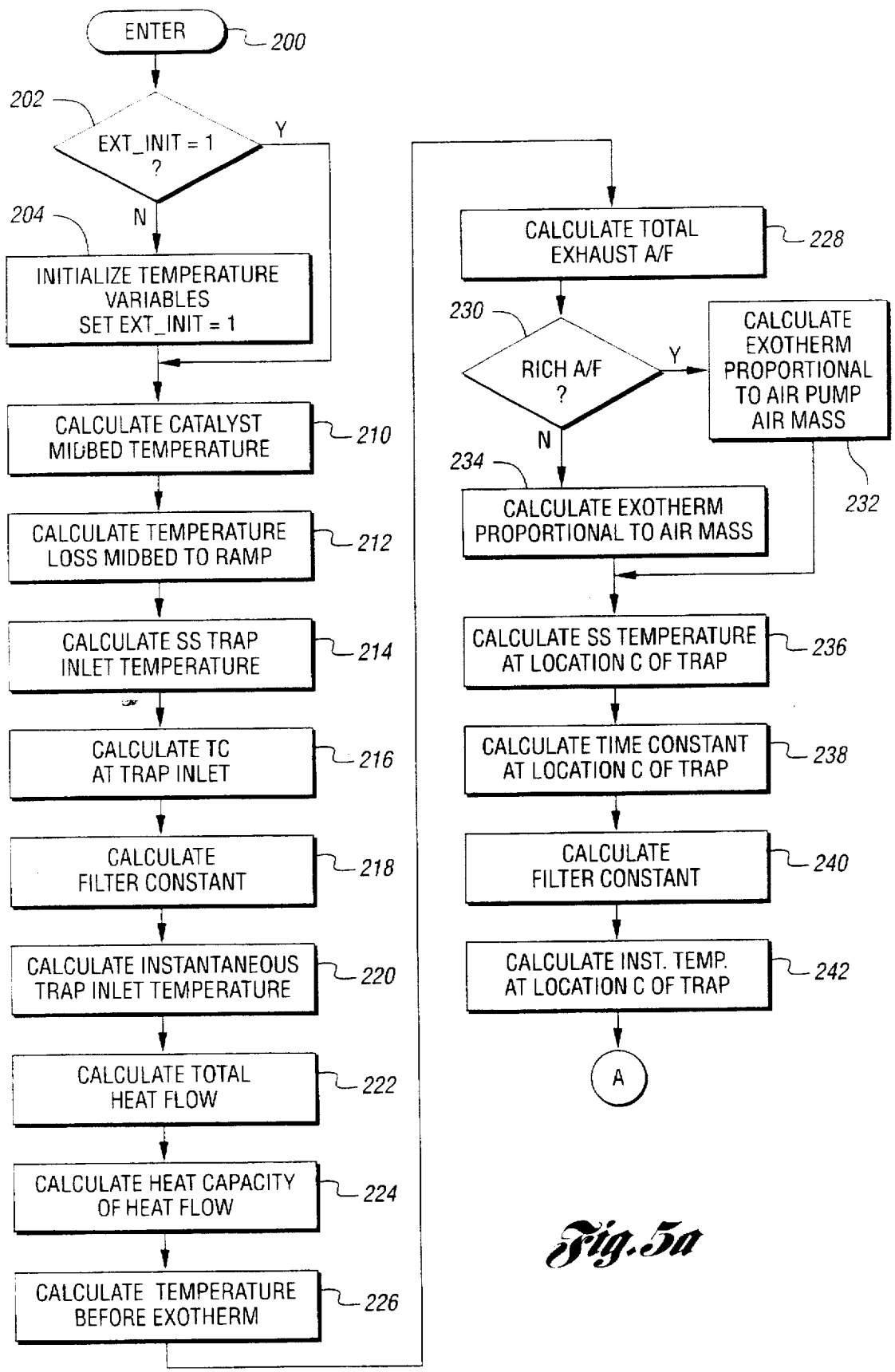
FIGS. 5a and 5b show a flowchart of the $NO_x$ trap temperature determining method of the present invention.
Figure 5B:
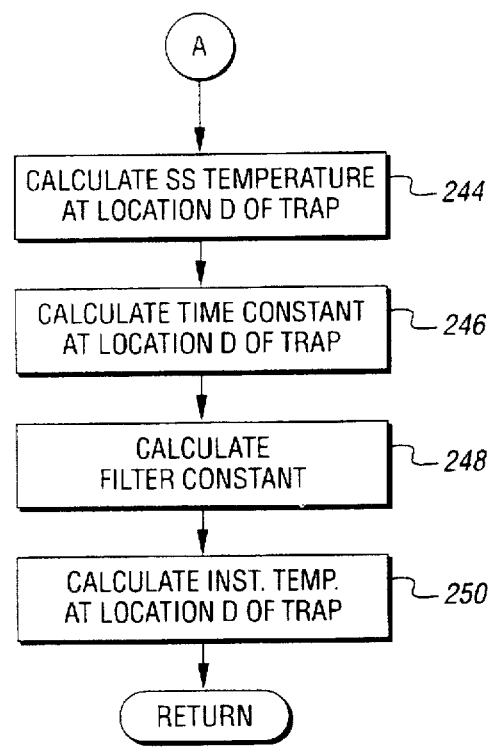

Referring now to FIG. 5, a flowchart depicting the steps in a routine performed by the EEC 20 for inferring $NO_x$ trap temperature is shown. The temperature determination routine is entered at 200 and at 202 an initialization flag EXT_INIT is checked to determine if certain temperature variables have been initialized. If not, the temperature variables are initialized at 204, after which the flag EXT_INIT is set to 1. A preferred embodiment advantageously initializes certain temperature variables in a manner to account for instances where an engine may be turned off for short periods of time in which the $NO_x$ trap 32 may not have cooled to ambient temperature. $NO_x$ trap over temperature conditions are accordingly avoided by estimating $NO_x$ trap temperature upon engine ignition as a function of estimated $NO_x$ trap temperature upon engine shut-off, ambient temperature, a calibratable time constant indicative of $NO_x$ trap cooling and the time elapsed from engine shut-off to subsequent engine operation. The initialization of the temperature at locations "B", "C" and "D" is accomplished in accordance with the following Equations 1, 2 and 3.

$$\text{ext\_ntB\_init} = ((\text{ext\_ntB\_prev} - \text{infamb}) * \text{fnexp}(-\text{soaktime}/\text{tc\_ntB})) + \text{infamb} \quad (1)$$

$$\text{ext\_ntC\_init} = ((\text{ext\_ntC\_prev} - \text{infamb}) * \text{fnexp}(-\text{soaktime}/\text{tc-ntC})) + \text{infamb} \quad (2)$$

$$\text{ext\_ntD\_init} = \text{ext\_ntC\_init} \quad (3)$$

where:

ext_ntB_prev=estimated $NO_x$ trap temperature when the engine was turned off, fnexp is a look-up table value that approximates an exponential function, soaktime=time since engine was shut down in seconds, tc_nt=an empirically derived time constant associated with the cooling off of the exhaust gas at an identified location such as "B", in seconds, and infamb=inferred ambient temperature.

Ambient temperature may be inferred as indicated above or measured with a sensor. When ambient temperature is inferred (infamb) the value is stored keep alive memory 78 and is initialized at block 204. If the absolute difference between air charge temperature (ACT) and engine coolant temperature(ECT) is within a calibratable tolerance, usually about 6 degrees, it may be assumed that the engine is at equilibrium or ambient temperature and therefore that ambient temperature is equal to ACT. Otherwise, ambient temperature is assumed to be smaller of the last known ambient temperature in KAM 78 or ACT.

If the engine is running and if engine coolant temperature and vehicle speed are above minimum values, then a steady state forcing function is calculated as ACT-Δ, where Δ is about 10 degrees F. if the air conditioning clutch is not engaged and is about 20 degrees F if the air conditioning clutch is engaged. Normally, the forcing function is filtered by a rolling average but if ACT is ever less than inferred ambient then infamb is set to ACT immediately.

At block 210, the instantaneous midbed temperature of the catalytic converter 26 is calculated in accordance with the disclosure in U.S. Pat. No. 5,414,994, assigned to the assignee of the present invention and incorporated herein by reference.

At block 212, the temperature loss in the exhaust passage between the midbed of the catalytic converter 26 and the entrance "B" to the $NO_x$ trap 32 is calculated in accordance with Equation 4.

$$ext\_ls\_ntB = FNLS\_NTB(am) * [(ext\_cmd + ext\_ntB\_prev)/2 - infamb] \qquad (4)$$

where:

FNLS_NTB(am) is a unitless value, contained in a table indexed by mass air flow (am), which is indicative of a temperature drop between the catalytic converter and location "B" as a function of (am), ext_cmd=instantaneous converter catalyst midbed temperature calculated in block 210, and ext_ntB_prev=value of ext_ntB for the previous loop.

At block 214 the steady state $NO_x$ trap inlet temperature is calculated, in accordance with Equation 5.

$$ext\_ss\_ntB = ext\_cmd - ext\_ls\_ntB \qquad (5)$$

This is the exhaust gas temperature before the pierce point 62 of the air passage 58, which is just upstream of the entrance of the $NO_x$ trap 32. This temperature is determined by subtracting the temperature loss, calculated at block 212, from the catalyst midbed temperature, calculated at block 210.

At block 216, the time constant of the temperature rise at the trap inlet is a function of air mass flow and is evaluated in accordance with Equation 6.

$$tc\_ntB\_run = FNTC\_NTB(am) \qquad (6)$$

where:

FNTC_NTB(am)=ROM calibration data table value of time constant, in seconds, indexed by air mass.

At block 218, a filter constant that perform an exponential smoothing function, is calculated from the time constant determined at block 216 in accordance with Equation 7.

$$fk\_ntB = 1/(1 + tc\_ntB\_run/bg\_tmr) \qquad (7)$$

where:

bg_tmr is the time, in seconds, for execution of the background loop.

At block 220, the instantaneous $NO_x$ trap inlet temperature at location "B" is calculated in accordance with Equation 8, from the previous value, the new steady-state value, and the filter constant.

$$ext\_ntB = fk\_ntB * ext\_ss\_ntB + (1 - fk\_ntB) * ext\_ntB\_prev \qquad (8)$$

where:

ext_ntB_prev=previous value of inlet temperature.

The temperature at the front face "C" of the material 32, is the total heat flow divided by the heat capacity of the heat flow, overlooking for the moment the effect on this temperature of the exothermic reaction of the exhaust gas with the trap material. At block 222, this total heat flow is calculated in accordance with Equation 9.

$$tot\_heat\_flw = EXT\_CP\_FUEL2 * fuel\_flow * ext\_ntB + EXT\_CP\_AIR2 * am * ext\_ntB + EXT\_CP\_AIR2 * airpump\_am * infamb \qquad (9)$$

where:

EXT_CP_FUEL2=heat capacity of fuel and is a calibration constant,

EXT_CP_AIR2=heat capacity of air and is a calibration constant, airpump_am=air pump air mass flow in kg/min am=engine air mass flow (kg/min) fuel_flow=engine fuel flow (kg/min).

The heat capacity of this total heat flow is calculated in accordance with Equation 10, at block 224.

$$exh\_ht\_cap = EXP\_CP\_AIR2 * (am + airpump\_am) + EXT\_CP\_FUEL2 * fuel\_flow \qquad (10)$$

As previously stated, the temperature at the front face "C" of the trap material 32, before exotherm is the total heat flow calculated at block 222 divided by the heat capacity of the heat flow calculated at block 224, and is calculated at block 226 in accordance with Equation 11.

$$ext\_ntC\_before\_exo = tot\_heat\_flw/exh\_ht\_cap \qquad (11)$$

The exotherm energy calculation depends on whether the air/fuel ratio at the entrance to the $NO_x$ trap 32 is rich or lean as calculated at block 228. The exhaust air/fuel ratio at the entrance to the $NO_x$ trap 32 is calculated in accordance with Equation 12.

$$lambse\_ntr = lambse\_exh * ((airpump\_am + am)/am) \qquad (12)$$

where:

lambse_exh is the exhaust A/F equivalence ratio measured before the air from the air pump is introduced in the exhaust.

If the A/F is rich, the exotherm energy is limited by and proportional to the amount of air pump air mass. Once all of the excess air is burned, additional rich products (hydrocarbons) cannot burn or produce further heat. If rich, as determined by block 230, the exotherm energy is calculated in accordance with Equation 13, as indicated at block 232.

$$\text{ntr\_exo\_energy} = \text{airpump\_am} * \text{FN\_NTR\_EXO\_R (lambda\_ntr)}$$

where:

FN_NTR_EXO_R(lambda_ntr) is a value obtained from a look-up table that contains empirical data describing the exotherm energy. The units are joules per pound of air pump air mass and is mapped against the exhaust A/F.

If the air/fuel ratio is lean, then exotherm energy is calculated in block 234 in accordance with Equation 14. When lean, the exotherm energy is limited by and proportional to the engine air mass which at a given equivalence ratio is proportional to fuel mass or heat energy.

$$\text{ntr\_exo\_energy} = (\text{am}) * \text{FN\_NTR\_EXO\_L(lambse\_ntr)} \quad (14)$$

where:

FN_NTR_EXO_L(lambse_ntr) is a value obtained from a look-up table that contains empirical data describing the exotherm energy. The units are joules per pound of air pump air mass and is mapped against the exhaust A/F.

In either event, the exotherm temperature at the $NO_x$ trap entrance is calculated in accordance with Equation 15 at block 235. The exotherm temperature is the exotherm energy calculated in Equations 13 or 14 divided by the heat capacity calculated in Equation 10.

$$\text{ext\_ntr\_exo} = \text{ntr\_exo\_energy}/\text{exh\_ht\_cap} \quad (15)$$

The forcing function or steady-state equivalent of the temperature near the front face of the $NO_x$ trapping material 32, indicated at "C", is calculated in block 236 in accordance with Equation 16, and is the combined temperature due to the gas temperature and the air pump induced exotherm. The air pump pierce point 62 is close enough to the Nox trap 32 to ignore a temperature drop from "B" to "C"

$$\text{ext\_ss\_ntC} = \text{ext\_ntC\_before\_exo} + \text{ext\_ntr\_exo} \quad (16)$$

The time constant of the temperature rise near the front face "C" of the trap 32 is a calibratable function of the total air flow and is evaluated at block 238 in accordance with Equation 17.

$$\text{tc\_ntC\_run} = \text{FNTC\_NTC(am+airpump\_am)} \quad (17)$$

where:

FNTC_NTC=ROM calibration data table value of time constant, in seconds, indexed by total air mass.

At block 240, a filter constant for performing a smoothing function is calculated in accordance with Equation 18 based on the time constant, evaluated in accordance with Equation 17.

$$\text{fk\_ntC} = 1/(1+\text{tc\_ntC\_run}/\text{bg\_tmr}) \quad (18)$$

Finally, at block 242, the instantaneous temperature near the front face "C" of the trap 32 is calculated in accordance with Equation 19 from the previous value, new steady-state value, and the filter constant.

$$\text{ext\_ntC} = \text{fk\_ntC} * \text{ext\_ss\_ntC} + (1-\text{fk\_ntC}) * \text{ext\_ntC\_prev} \quad (19)$$

where:

ext_ntC_prev=the value of ext_ntC calculated on the previous loop.

At blocks 244 through 248, a temperature which is more representative of an average temperature of the trap 32 is calculated. At block 244, the steady state average temperature of the trap 32 is calculated in accordance with Equation 20, which is based on the assumption that there is no temperature drop from the location "C" to the location "D" and therefore at steady state the two temperatures are equal.

$$\text{ext\_ss\_ntD} = \text{ext\_ntC} \quad (20)$$

There is a time constant as a function of air mass which causes the temperature at location "D" to lag the temperature at location "C". This time constant is due to the thermal capacitance of the trap substrate and trap material. At block 246, the time constant at location "D" in the trap is evaluated in accordance with Equation 21. This time constant is a function of the total air flow.

$$\text{tc\_ntD\_run} = \text{FNTC\_NTD(am+airpump\_am)} \quad (21)$$

A filter constant is calculated at block 248 from the time constant in accordance with Equation 22.

$$\text{fk\_ntD} = 1/(1+\text{tc\_ntD\_run}/\text{bg\_tmr}) \quad (22)$$

Finally, the instantaneous average temperature of the trap 32 is calculated at block 250 in accordance with Equation 23 from the previous value, new steady-state value, and the filter constant.

$$\text{ext\_ntD} = \text{fk\_ntD} * \text{ext\_ss\_ntD} + (1-\text{fk\_ntD}) * \text{ext\_ntD\_prev} \quad (23)$$

Figure 6:
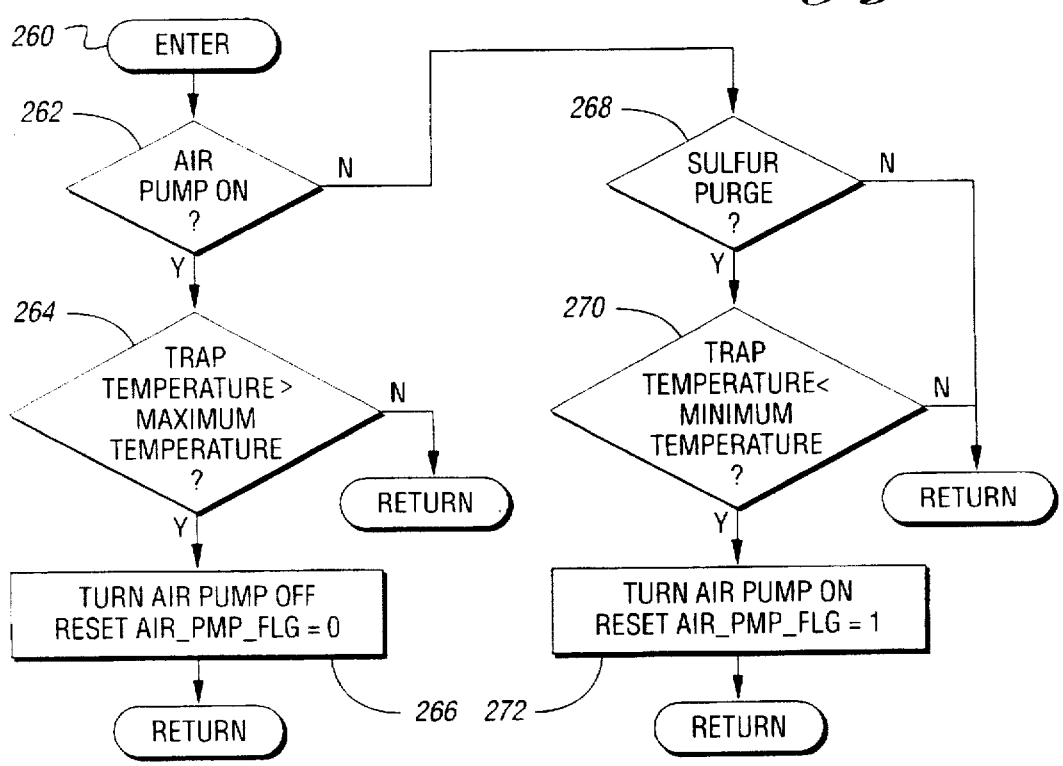
FIG. 6 is a flowchart of a air pump control valve control scheme based on $NO_x$ trap temperature.

Knowing the temperature of the $NO_x$ trap permits various control schemes. One scheme is to disable the lean open loop operation and enter a closed loop stoichiometric operation if the inferred temperature is greater than a predetermined maximum temperature. If the temperature remains too high during stoichiometric operation, a rich open loop mode of operation may be invoked. Another use is the control of the air pump control valve 56 in accordance with the flowchart shown in FIG. 6. The routine shown in FIG. 6 is entered at 260 and at decision block 262 the status of the air pump flag AIR_PMP_FLG is checked. If the flag is set, indicating that the air pump is on, then the trap temperature at location "C" of the $NO_x$ trap is compared with a maximum temperature above which the trap is subject to irreversible damage. If the maximum temperature is exceeded, as determined by block 264, then the air pump is turned off at block 266 and the flag AIR_PMP_FLG is reset and the routine returns to the main program. On the other hand, if the pump is not on and a sulphur purge of the $NO_x$ trap is required as determined by the block 268, then the trap temperature at location "D" is checked at block 270 to determine if the temperature is less than the minimum temperature required for $SO_x$ purging. If so, the air pump is turned on at block 272 in order to raise the $NO_x$ trap temperature and the flag AIR_PMP_FLG is set and the routine returns to the main program.

While the best mode for carrying out the present invention has been described in detail, those familiar with the art to which this invention relates will recognize various alternative designs and embodiments for practicing the invention as defined by the following claims.

What is claimed is:

1. A method of estimating the temperature of a $NO_x$ trap located in an exhaust passage of an engine downstream from a catalytic converter, said exhaust passage including a pierce point located between said converter and said trap permitting controlled amounts of air to be added to the exhaust passage from an air pump prior to entry into said trap, comprising a sequence of the steps of:

calculating the instantaneous temperature at a first location upstream of said pierce point based on a previous instantaneous temperature value at said first location, an estimated steady-state value, and a predetermined temperature rate of change at said first location as a function of engine air mass flow;

calculating the instantaneous temperature at a second location at the front face of the $NO_x$ trap based on a previous instantaneous temperature value at said second location, an estimated steady-state value at said second location based on the instantaneous temperature at said first location, and a predetermined temperature rate of change at said second location as a function of the sum of engine air mass flow and air pump air mass flow.

2. The method of claim 1 comprising the further steps of:

comparing said calculated instantaneous temperature at said second location with a maximum threshold temperature value, and adjusting the amount of air introduced at said pierce point to reduce said instantaneous temperature at said second location whenever said instantaneous temperature at said second location exceeds said maximum threshold temperature value.

3. The method of claim 1 comprising the further steps of:

comparing said calculated instantaneous temperature at said second location with a minimum threshold temperature value, and adjusting the amount of air introduced at said pierce point to raise said instantaneous temperature at said second location whenever said instantaneous temperature at said second location falls below said minimum threshold temperature value.

4. The method of claim 1 further comprising the step of:

calculating the instantaneous temperature within the $NO_x$ trap based on a previous instantaneous temperature value within the $NO_x$ trap, said estimated steady-state value at said second location, and a predetermined temperature rate of change within said trap as a function of air mass flow over the trap.

5. A method of estimating the temperature of a $NO_x$ trap located in an exhaust passage of an engine downstream from a catalytic converter, said exhaust passage including a pierce point located between said converter and said trap for adding controlled amounts of air to the exhaust prior to entry into said trap, comprising a sequence of the steps of:

estimating the instantaneous exhaust gas midbed temperature at a midbed location in the catalyst of said catalytic converter, estimating the drop in temperature from said midbed location to a first location upstream of said pierce point;

calculating an estimated steady state temperature value at said first location by subtracting said estimated drop in temperature from said midbed temperature;

calculating a first time constant that represents a predetermined temperature rate of change at said first location as a function of engine air mass flow;

calculating a first filter constant from said first time constant;

calculating the instantaneous temperature at said first location based on a previous instantaneous temperature value, said estimated steady-state value, and said first filter constant;

calculating the total heat flow at a second location at the front face of the $NO_x$ trap without accounting for any exothermic reaction;

calculating the heat capacity of said total heat flow;

calculating the instantaneous temperature at said second location by dividing the total heat flow by the heat capacity of the heat;

calculating the exhaust air/fuel ratio at said second location;

if said air/fuel ratio is rich, calculating the exothermic energy as a function of the amount of air pump air mass;

if said air/fuel ratio is lean, calculating the exothermic energy as a function of the amount of engine air mass;

calculating the temperature generated by exothermic energy at said second location;

calculating the steady state temperature at said second location by adding the calculated temperature before any exothermic reaction to the calculated temperature generated by the exothermic energy;

calculating a second time constant that represents a predetermined temperature rate of change at said second location as a function of total air mass flow;

calculating a second filter constant from said second time constant;

calculating the instantaneous temperature at said second location based on a previous instantaneous temperature value at said second location, said estimated steady-state value at said second location, and said second filter constant.

6. The method defined in claim 5 further comprising the further steps of:

calculating a third time constant that represents a predetermined temperature rate of change within the $NO_x$ trap as a function of total air mass flow;

calculating a third filter constant from said third time constant;

calculating the instantaneous temperature within the $NO_x$ trap based on a previous instantaneous temperature value within the $NO_x$ trap, said estimated steady-state value at said second location, and said third filter constant.

7. A method of controlling the temperature of a $NO_x$ trap comprising the steps of:

estimating the temperature of the $NO_x$ trap in accordance with the steps of claim 1 and;

terminating an open loop lean mode of operation and initiating a closed loop stoichiometric mode of operation if the calculated temperature at said second location exceeds a predetermined maximum temperature.

8. A method of estimating the temperature of a $NO_x$ trap located in an exhaust passage of an engine downstream from a catalytic converter, said exhaust passage including a pierce point located between said converter and said trap for adding controlled amounts of air to the exhaust prior to entry into said trap, comprising a sequence of the steps of:

estimating the instantaneous exhaust gas temperature at a midbed location in the catalyst of said catalytic converter, estimating the drop in exhaust gas temperature from said midbed location to a first location upstream of said pierce point;

calculating an estimated steady state temperature value at said first location by subtracting said estimated drop in exhaust gas temperature from said midbed temperature;

calculating the instantaneous temperature at said first location based on a previous instantaneous temperature value, said estimated steady-state value, and a predetermined temperature rate of change at said first location as a function of engine air mass flow;

calculating the total heat flow at a second location at the front face of the $NO_x$ trap without accounting for any exothermic reaction;

calculating the heat capacity of said total heat flow;

calculating the instantaneous temperature at said second location by dividing the total heat flow by the heat capacity of the heat;

calculating the exhaust air/fuel ratio at said second location;

if said air/fuel ratio is rich, calculating the exothermic energy as a function of the amount of air pump air mass;

if said air/fuel ratio is lean, calculating the exothermic energy as a function of the amount of engine air mass;

calculating the temperature generated by the exothermic energy at said second location;

calculating the steady state temperature at said second location by adding the temperature before any exothermic reaction to the temperature generated by the exothermic energy;

calculating the instantaneous temperature at said second location based on a previous instantaneous temperature value at said second location, said estimated steady-state value at said second location, and a predetermined temperature rate of change at said second location as a function of total air mass flow.

* * * * *